() United States Patent  
Bjorkegren et al.

(10) Patent No.: US 8,432,874 B2  
(45) Date of Patent: Apr. 30, 2013

(54) ESTIMATION OF SIGNAL TO INTERFERENCE RATIO IN CONJUNCTION WITH INTERFERENCE CANCELLATION

(75) Inventors: Hakan Bjorkegren, Taby (SE); Christer Edholm, Taby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 286 days.

(21) Appl. No.: 12/989,712

(22) PCT Filed: Feb. 26, 2009

(86) PCT No.: PCT/SE2009/050214  
§ 371 (c)(1),  
(2), (4) Date: Oct. 26, 2010

(87) PCT Pub. No.: WO2009/134187  
PCT Pub. Date: Nov. 5, 2009

(65) Prior Publication Data  
US 2011/0176518 A1 Jul. 21, 2011

(30) Foreign Application Priority Data  
Apr. 29, 2008 (EP) .................................. 08155334

(51) Int. Cl.  
*H04W 7/216* (2006.01)

(52) U.S. Cl.  
USPC ......................................................... 370/335

(58) Field of Classification Search .................. 370/310, 370/310.2, 320, 328, 335, 342, 431  
See application file for complete search history.

(56) References Cited

U.S. PATENT DOCUMENTS

| 6,072,845 | A  | * | 6/2000  | Bond et al. .................... 375/350 |
| 6,961,362 | B2 | * | 11/2005 | Ariyoshi et al. ............... 375/130 |
| 2004/0023627 | A1 |   | 2/2004  | Osaki et al. |
| 2006/0050662 | A1 | * | 3/2006  | Rizvi et al. .................... 370/320 |
| 2007/0141990 | A1 |   | 6/2007  | Zeng et al. |

FOREIGN PATENT DOCUMENTS  
WO 2004/051902 A1 6/2004

\* cited by examiner

*Primary Examiner* — Kwang B Yao  
*Assistant Examiner* — Anh Ngoc Nguyen  
(74) *Attorney, Agent, or Firm* — Coals & Bennett, P.L.L.C.

(57) ABSTRACT

A node (2) for use in a cellular communication system having interfering signals and employing interference cancellation techniques for mitigating the interfering signals comprises means (24) for obtaining a signal value representing power of a first signal. The node (2) further comprises means (25) for obtaining a precancellation interference value representing powers of signals interfering with the first signal before the interference cancellation is employed. A predictor (23) is arranged for predicting a postcancellation interference value after the interference cancellation as a function of the precancellation interference value. An estimator (29) is connected to the predictor (23) and the means (24) for obtaining a signal value. The estimator (29) is arranged for estimating a signal-to-interference ratio as a ratio between the signal value representing the power of the first signal and the predicted postcancellation interference value.

29 Claims, 6 Drawing Sheets

ESTIMATION OF SIGNAL TO INTERFERENCE RATIO IN CONJUNCTION WITH INTERFERENCE CANCELLATION

TECHNICAL FIELD

The present invention relates in general to cellular communication and in particular to methods and means making use of the ratio between signal and interference in the presence of interference cancellation.

BACKGROUND

Code Division Multiple Access (CDMA) is a multiple access method based on spread spectrum used in cellular communication systems. In CDMA, the narrow band data signal of a user is spread across a relatively wide frequency band using a spreading code having a broader bandwidth than the data signal. Typically, many users transmit simultaneously using that same frequency band. An individual spreading code is also used on each connection between the base station and the mobile station so that individual user signals may be distinguished from each other at a receiver based on the user's spreading code. Mutually orthogonal spreading codes are desirable because they do not correlate with each other. In practice, the spreading codes are not completely non-correlated, and the signals of other users complicate the detection of the desired signal by distorting the received signal. The mutual access interference caused by simultaneous users is a key factor affecting the capacity of a CDMA cellular communication system. The interference may be reduced by attempting to keep the transmission power levels of mobile stations as low as possible using Transmit Power Control (TPC).

Many types of communication systems therefore rely on power control to maintain a desired quality of service. TPC is typically achieved by having the receiver measuring the received Signal-to-Interference Ratio (SIR), comparing the measured SIR with a desired SIR and finally adjusting the transmit power up or down to minimize the difference between the desired and the measured SIR.

In WCDMA (Wideband CDMA), an inner power control loop performs this adjusting, while an outer loop power control is used to adjust the desired SIR to reflect the actually desired quality of service. Such quality of service is most often defined as a desired block error rate or the desired number of retransmissions. The outer loop is typically relatively slow, having a typical update rate of 10 to 100 Hz in WCDMA.

The transmit power is typically adjusted by the inner loop on regular basis. In WCDMA the update rate is 1500 Hz. Typically, a TPC command is used to inform the transmitter to change its power. In order to save signaling resources, these TPC commands are typically binary and thus it can only ask the transmitter to increase or decrease its output power with a predetermined amount (typically 1 dB). Furthermore, there will be a delay associated with the TPC loop as it will take some time to measure the SIR, to transmit the TPC command, to demodulate the TPC command, and to update the transmit power. In WCDMA this delay is typically 2-3 ms.

Without TPC the SIR would vary due to varying interference and the fading rate of the radio channel transmitter. The ability of the transmit power control to maintain the desired SIR is limited by the update rate, the delay in the loop and the size of the power control step. Power control is essential for e.g. WCDMA Uplink (UL) to maintain coverage and capacity. Furthermore, with EUL and increased data rates, interference cancellation is envisioned to play an important role to enable these high data rates. The area of advanced receivers and specifically interference suppression or cancellation will be very important for reaching working conditions to secure high system capacity when allowing multiple high data rate users to be active. The associated area of issues and aspects of control handling as the delay or quality of system commands is important to cover and secure IPR within to secure efficient usage and achieving the performance potential of the more advanced receiver techniques from a system point of view.

Interference Cancellation (IC) can be used to improve the SIR. With IC, part of the interference is typically demodulated and regenerated and then cancelled before demodulating other user's signals. Ideally, it would be beneficial to use such improved SIR for reducing the transmit power and thereby allowing for additional traffic and control signaling resources to be used. However, using the SIR values obtained by conventional IC methods implies quite a significant delay. The delay is due to that it takes time to process the IC. In postcoding IC, the received signal of a Time Transmission Interval (TTI) is first decoded. Interference signals are thereafter regenerated and cancelled. This implies that when postcoding IC is employed, a complete Time Transmission Interval (TTI), e.g. 2 or 10 ms for Enhanced Uplink (EUL)/WCDMA, of the signal to be cancelled, must be received before that signal can be decoded, regenerated, and cancelled. Thus, the minimum delay for post-decoding IC corresponds to one TTI of the signal to be cancelled. It is important for the TPC to use an SIR estimate that reflects the SIR as experienced when demodulating the data channel, which can carry data as well as voice traffic. This would significantly limit the ability of TPC to follow the varying conditions of the channel, e.g. fading and interference, and, will for some cases cause oscillations in mobile station transmit power.

The most straightforward solution to handle this delay due to IC is to ignore the delay and have the TPC to operate as usual without any knowledge about the IC. However, then the measured SIR will not reflect the gains from applying IC. The problem is then that the overall gain with IC will be very small as the TPC will not be able to take into account the SIR improvements achieved by the applying IC. The outer loop power control could slowly adjust the SIR target in order to compensate for this. However, adjusting the out loop is a very slow process and constraints on control channel performance may limit the actual performance. Control channel performance could be addressed by adjusting static control channel power settings.

However, it is not desirable to have power settings that are depending on the algorithm used.

SUMMARY

An object of the present invention is to generate reliable SIR estimates in systems using IC without causing unfavorable delays.

The above object is achieved by methods and devices according to the enclosed patent claims. In general words, in a first aspect, a method for estimating a signal-to-interference ratio in a cellular communication system having interfering signals and employing interference cancellation techniques for mitigating the interfering signals comprises the step of obtaining of a signal value representing a power of a first signal. The method further comprises obtaining of at least one precancellation interference value representing powers of signals interfering with the first signal before the interference cancellation is employed. A postcancellation interference value representing a sum of powers of signals interfering with the first signal after the interference cancellation is predicted as a function of the precancellation interference value. A signal-to-interference ratio is estimated as a ratio between the signal value representing the power of the first signal and the predicted postcancellation interference value.

In a second aspect, a method for power control in a cellular communication system having interfering signals and employing interference cancellation techniques for mitigating the interfering signals comprises the step of receiving a signal comprising a first signal and signals interfering with the first signal. A signal-to-interference ratio of the received signal is estimated according to the first aspect. A transmit power control message is created based on the estimated signal-to-interference ratio. The transmit power control message addressed to a node associated with transmission of the first signal is transmitted. Finally, interference cancellation is performed on the received signal.

In a third aspect, a node for use in a cellular communication system having interfering signals and employing interference cancellation techniques for mitigating the interfering signals comprises means for obtaining a signal value representing power of a first signal. The node further comprises means for obtaining at least one precancellation interference value representing powers of signals interfering with the first signal before the interference cancellation is employed. A predictor is connected to the means for obtaining at least one precancellation interference value and is arranged for predicting a postcancellation interference value representing a sum of powers of signals interfering with the first signal after the interference cancellation as a function of the precancellation interference value. An estimator is connected to the predictor and the means for obtaining a signal value. The estimator is arranged for estimating a signal-to-interference ratio as a ratio between the signal value representing the power of the first signal and the predicted postcancellation interference value.

One advantage with the present invention is that a reliable SIR value is available at a significant earlier stage. Such improvement in time can in turn e.g. be utilized to improve e.g. the TPC, whereby the loop delay is reduced and the ability of following fast changing radio conditions is significantly improved.

BRIEF DESCRIPTION OF THE DRAWINGS

The invention, together with further objects and advantages thereof, may best be understood by making reference to the following description taken together with the accompanying drawings, in which.

DETAILED DESCRIPTION

Figure 1:
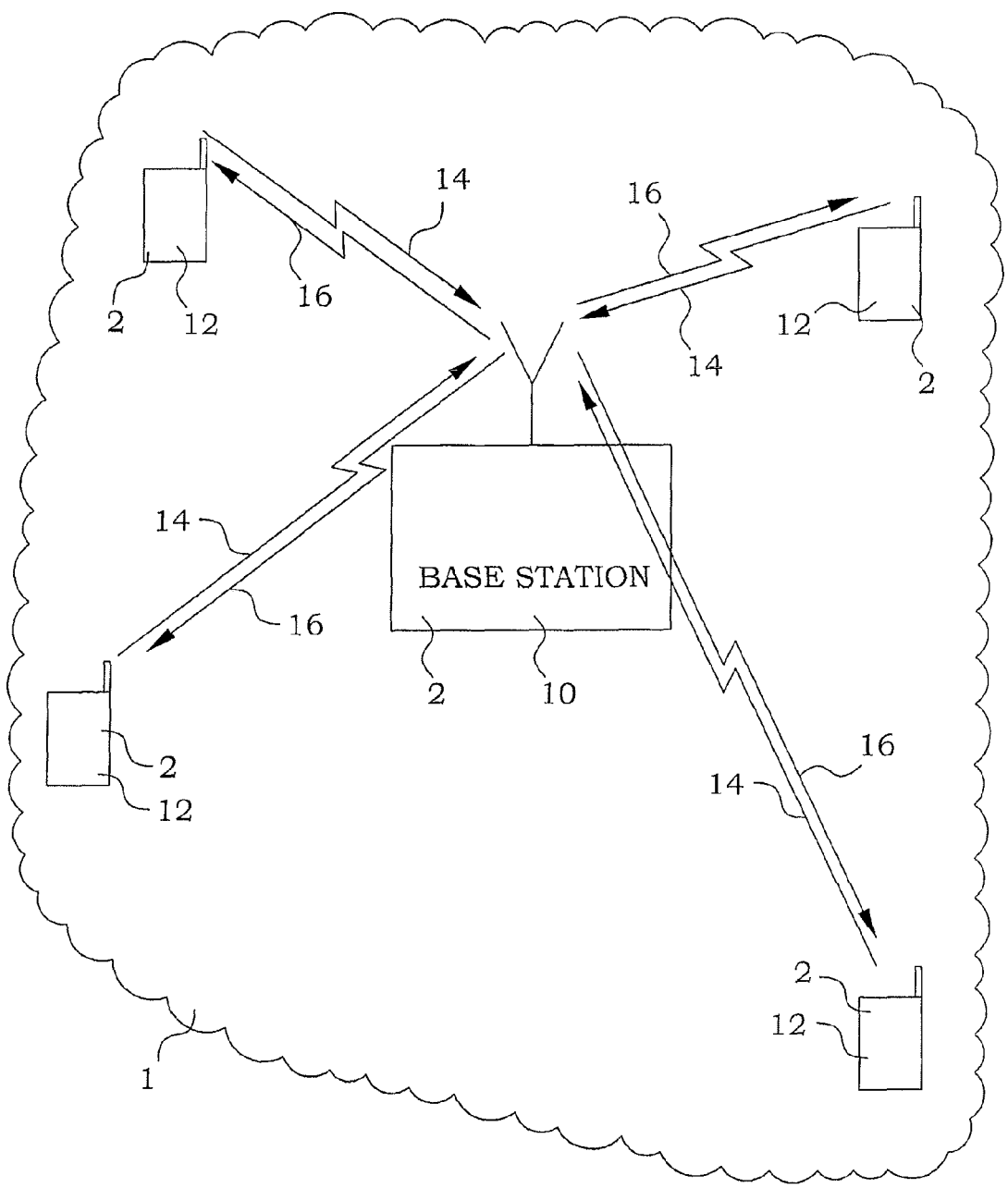
FIG. 1 is a schematic drawing of a wireless communication system.

In the drawings, corresponding reference numbers are used for similar or corresponding parts.

FIG. 1 illustrates a wireless communication system 1, having a number of communicating nodes 2. One of the nodes 2 is a base station 10, communicating with a plurality of other nodes 2; mobile stations 12. Signalling taking place from the base station 10 to a mobile station 12 is denoted downlink signalling 16 and signalling taking place from a mobile station 12 to the base station 10 is denoted uplink signalling 14. The signalling to and from the different mobile stations 12 will interfere with each other. To reduce such interference, transmit power control is typically employed for finding a suitable transmit power level. This can be employed both in the uplink and downlink direction. Another approach is to use different interference cancellation techniques to mitigate the effects of the interference.

Figure 2:
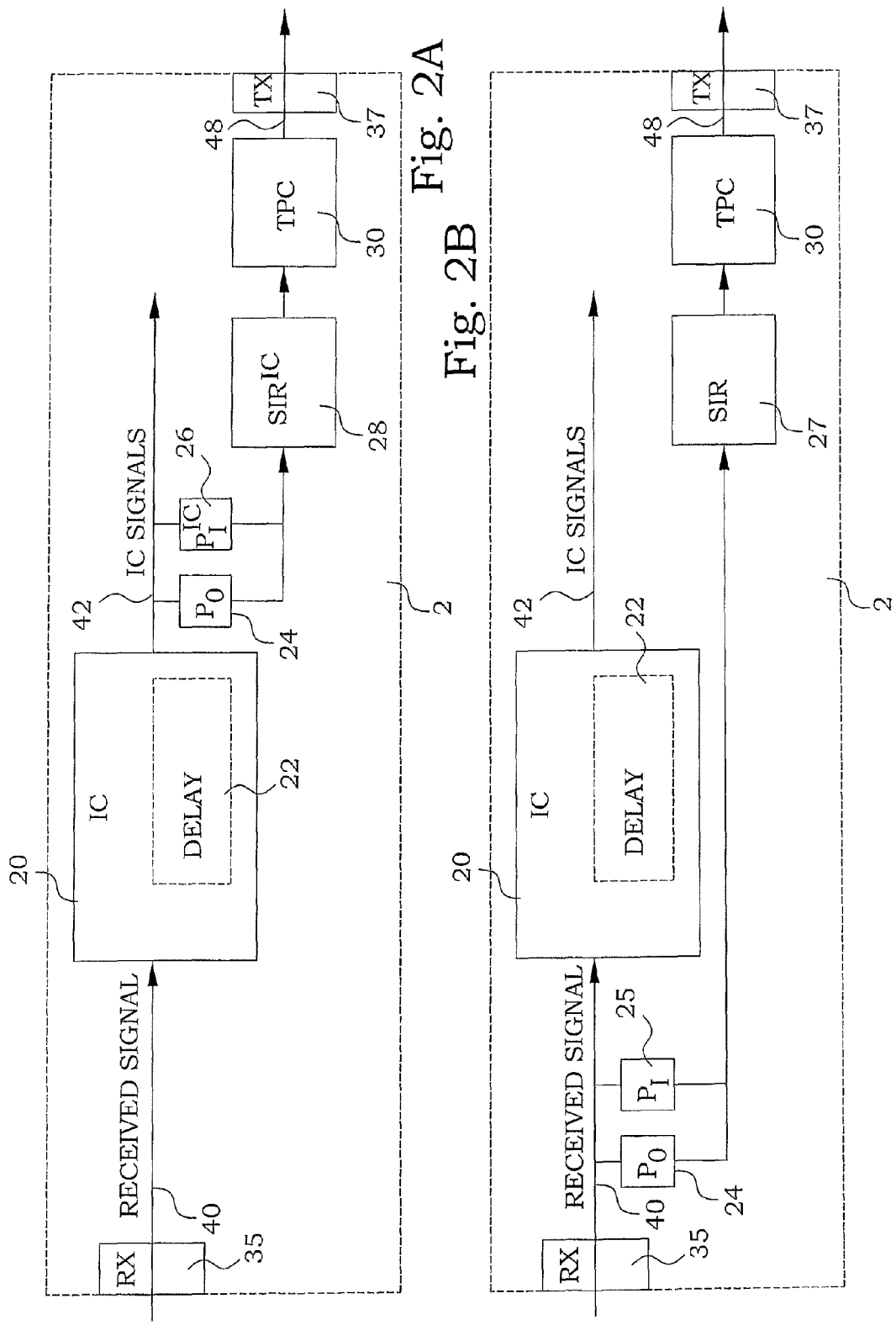
FIG. 2A is a block diagram of an embodiment of a node using transmit power control according to prior art.
FIG. 2B is a block diagram of another embodiment of a node using transmit power control according to prior art.

FIG. 2A illustrates a node 2 according to prior art employing transmit power control and using interference cancellation. A signal 40 is received and provided to an interference canceller 20. The interference canceller 20 produces an interference cancelled signal 42, where the influence of the interfering signals are at least reduced. Such an interference cancellation procedure is typically associated with a certain time delay 22. A means 24 for obtaining a signal value representing power of a first signal is connected to the interference cancelled signal 42. Likewise, a means 26 for obtaining a postcancellation interference value representing powers of signals interfering with the first signal is connected to the interference cancelled signal 42. The values of the signal power and the interference are provided to a means 28 for determining a signal-to-interference ratio of the interference cancelled signal. The so determined signal-to-interference ratio is provided to a transmit power controller unit 30, which uses the signal-to-interference ratio for determining what power control signals 48 that are going to be transmitted to the node transmitting the original signal 40. As discussed above, such an arrangement will have the disadvantage that the signal-to-interference ratio used for TPC is delayed 22.

Another approach is illustrated in FIG. 2B. Here, the means 24 for obtaining a signal value representing power of a first signal is connected directly to the received signal 40, i.e. before the interference cancellation takes place. Also a means 25 for obtaining a precancellation interference value representing powers of signals interfering with the first signal is connected to the received signal 40. A means 27 for determining a signal-to-interference ratio of the received signal utilizes the values of the signal and precancellation interference to determine a signal-to-interference ratio, which then can be utilized for TPC purposes. Here, no delay is present. However, the TPC procedure totally neglect the improved interference situation provided by the interference canceller 20, and only slow adaptations using changes in the target signal-to-interference ratio can be used for compensate for such effects.

The present disclosure presents an invention providing adaptive interference or SIR prediction, taking into consideration advanced receiver processing techniques, e.g. interference cancellation receivers. Also adjustments to compensate for potential prediction errors can preferably be provided.

Embodiments herein predict the interference that probably will be experienced after the advanced processing such that the impact can be captured. The predicted "efficient" remaining interference can be used when estimating the SIR in for example inner loop power control. Since the prediction accuracy can be evaluated at a later stage, e.g. after post decoding interference cancellation, the interference prediction can be adaptively adjusted to improve the accuracy over time from potential prediction errors.

Embodiments applied to power control advantageously generate accurate inner loop power control commands (TPC) can be generated by the system in a timely manner. Any processing delays imposed by the advanced detection processing can be avoided and therefore allowing the TPC to follow the varying channel and interference conditions. Such varying channel and interference conditions could otherwise be jeopardized by the delay and can create a number of issues, e.g. oscillation in mobile station transmit powers likely creating lower system throughput or capacity. Furthermore, the performance gain by advanced processing, e.g. IC, is momentarily available by the inner loop power control for system performance improvement, rather then the potential system gain would be available via the outer loop power control which is a much slower and conservative process.

Figure 3:
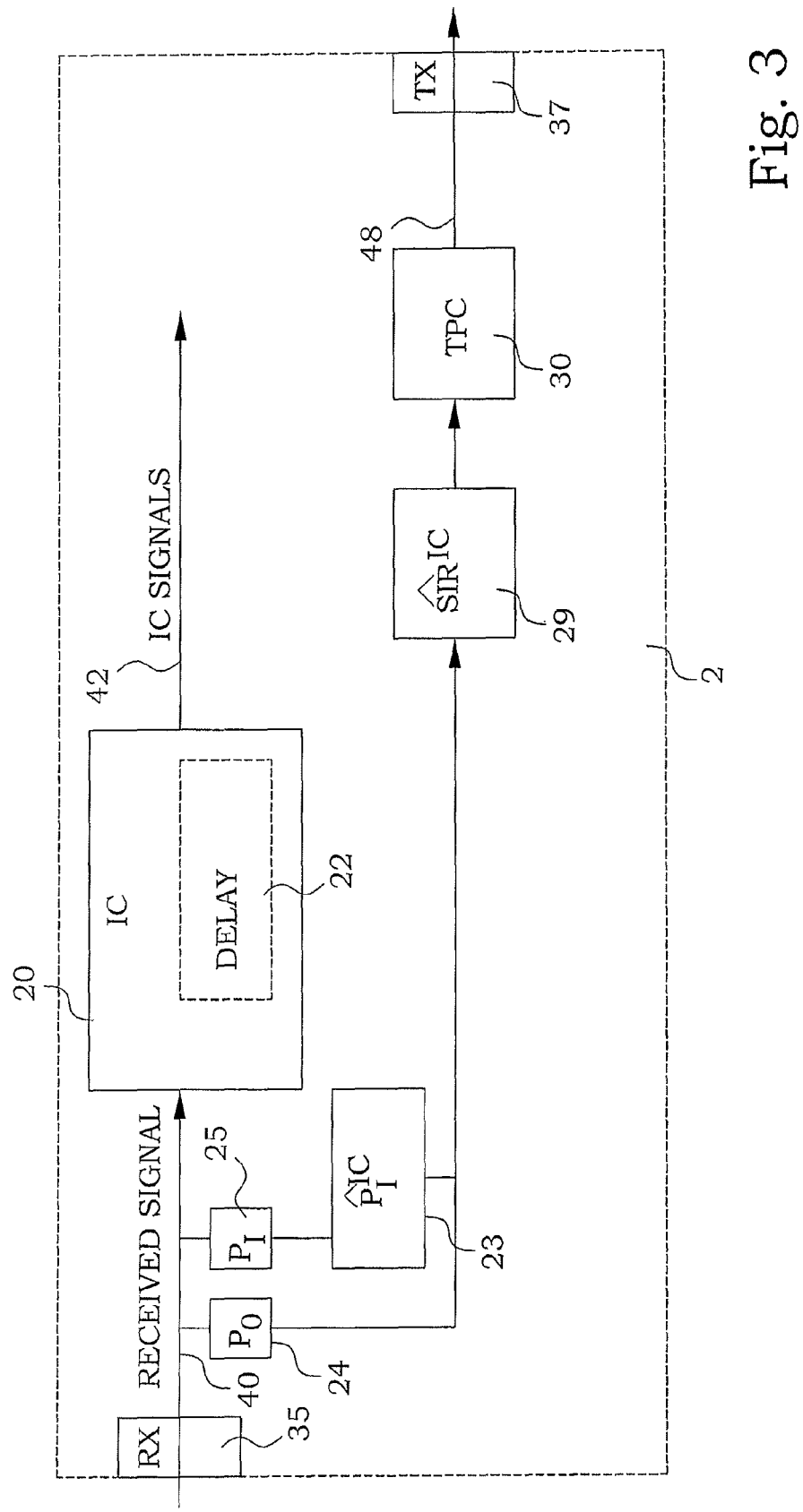
FIG. 3 is a block diagram of an embodiment of a node using transmit power control according to the present invention.

FIG. 3 illustrates a node 2 for use in a cellular communication system. The cellular communication system operates with interfering signals between different other nodes and employs interference cancellation techniques for mitigating the interfering signals. The node 2 receives a signal 40 in a receiver 35, which signal 40 comprises a first signal intended for the node 2 together with interfering signals. The node 2 comprises a means 24 for obtaining a signal value representing power of the first signal. This means 24 for obtaining a signal value is typically implemented as a channel estimator despreading pilot symbols on the control channel belonging to the first signal and a power meter for measuring the power of the power of the despread pilots by averaging the squares of the same. If multipath is present, then this is performed on each path and the power contribution from each path is then summed. Possibly, a scaling factor is also applied to account for the spreading factor.

The node 2 further comprises a means 25 for obtaining at least one precancellation interference value representing powers of signals interfering with the first signal. This means 25 for obtaining a precancellation interference value is typically implemented as a channel estimator and power meter applied on the control channel of the interfering signal. By knowing or assuming, by the result of a clever guess, a power offset between the control channels and the data channel of the same signal the total interfering signal can be obtained as the sum of the power of the control signal and the data channel.

As an alternative, if the offset is unknown, then the power of the data channel can be measured directly. This, however, assumes that the spreading codes that are used for the different signals are known. The data channel is despread and power is measured as averaged over a reasonable number of data symbols.

If the data signal cannot be demodulated, then the power of the whole received signal, i.e. including both the desired and the interferer, can be measured. Then the interfering power could be estimated as a difference between this total power minus the power of the desired signal, where scaling takes care of the different spreading factors.

The interfering signal power is obtained before the interference cancellation is employed. The implementation of these means follows preferably prior art technology, e.g. according to what was presented in connection with FIG. 2B.

The node further comprises an interference canceller 20, reducing the impact of interference signals to the first signal. The interference canceller 20 provides a interference cancelled signal 42 with a certain delay 22. The implementation of the interference canceller 20 can be performed according to any prior art interference cancellation techniques. However, the details of the interference cancellation as such are not of importance for the present invention to operate and are therefore omitted.

According to the present invention, the node 2 further comprises a predictor 23 connected to the means 25 for obtaining at least one precancellation interference value, $P_I$. The predictor 23 is arranged for predicting a postcancellation interference value $\hat{P}_I^{IC}$ representing a sum of powers of signals interfering with the first signal after the interference cancellation as a function of the precancellation interference value $P_I$. The prediction is thereby based on a measured quantity $P_I$, which is obtainable essentially in real time. A function giving the estimated postcancellation interference value $\hat{P}_I^{IC}$ has preferably to be adapted to the actual interference cancellation technique used, utilizing experience and statistical measures of the outcome as obtained at different signalling conditions. The prediction $\hat{P}_I^{IC}$ can therefore be assumed to be a good guess of what the later performed interference cancellation algorithms may produce.

The node 2 further comprises an estimator 29 for estimating a signal-to-interference ratio. The estimator 29 is connected to the predictor 23 and to the means 24 for obtaining a signal value. The estimator 29 is arranged for estimating the signal-to-interference ratio, $\hat{SIR}^{IC}$, as a ratio between the signal value $P_I$ representing the power of the first signal and the predicted postcancellation interference value $\hat{P}_I^{IC}$. The estimated signal-to-interference ratio $\hat{SIR}^{IC}$ is thus provided solely on measures that are obtainable before the actual interference cancellation takes place and can thus be provided essentially in real time without disturbing delays. At the same time, most of the expected impact of the interference cancellation can anyway be utilized for e.g. increasing the overall utilization of the wireless system.

The predictor 23 can, as mentioned further above, be designed in slightly different ways. The predictor function of the precancellation interference value $P_I$ is typically a function of a sum of the powers of signals interfering with the first signal. However, if different types of interfering signals can be cancelled with different efficiency, each interference signal or each interference type can be treated differently and thus the function can be a sum of functions of a respective one of the powers of signals interfering with the first signal. In a typical case, the function of the predictor is dependent on an estimated cancellation efficiency of the corresponding interference canceller. In many cases, the function may simply be a linear function having a proportionality constant equal to $(1-\alpha)$, where $\alpha$ is the estimated cancellation efficiency. In an alternative embodiment, where the efficiency of the interference canceller may vary with interference signal levels, the function can also be piecewise linear.

If the estimated signal-to-interference ratio, as in this embodiment, is to be used for power control purposes, the estimated signal-to-interference ratio $\hat{SIR}^{IC}$ is presented to a transmit power controller unit 30, for creating a suitable transmit power control command 48 based on the estimated signal-to-interference ratio $\hat{SIR}^{IC}$. A transmitter 37 is connected to the power control unit 30 and is arranged for transmitting the transmit power control command 48 addressed to a node associated with transmission of the first signal. The transmit power control command 48 represents, within the employed TPC model, the signal-to-interference situation that will occur when the interference cancellation procedure has been performed, but will be available at a far earlier time.

In one particular embodiment of the invention, applied in a WCDMA system, the interest is mainly concerned with IC techniques that cancel one or a few uplink (UL) high data rate user's signals before demodulating low data rate user's signals. Then, these low data rate users will benefit from IC by experiencing lower interference power. However, this implies quite a significant delay before low data rate user's signals experience an improved SIR.

Ideally, the SIR to be used in the TPC is the SIR experienced after interference cancellation. However, this will as mentioned before imply some extra delay in the SIR measurements. This delay is due to that it takes time to demodulate and regenerate the signal to be cancelled. In case that it is requested to make use of the channel code to further improve the cancellation efficiency, even further delay is due to that we have to wait until we have received a complete coding block before the IC processing can proceed.

In WCDMA, there are four different UL channels that are of importance for this embodiment. Two dedicated control channels (DPCCH, E-DPCCH) and two dedicated data channels (E-DPDCH, DPDCH). SIR estimation is most often done using the DPCCH. It is here assumed that anyone skilled in the art knows about the WCDMA uplink layer one, including slot formats and the general concept of TPC.

UL SIR estimation is in WCDMA done on a slot basis. One new SIR estimate is generated 15 times every 10 or 15 ms and a corresponding TPC command is sent to mobile station with 1 to 2 slots delay. The power of the received DPCCH signal and the interference are both typically estimated using pilots on DPCCH. In prior art the interference is known be filtered over several slots in many cases. This is to reduce its variance.

A TPC command is formed each slot by comparing the measured SIR with a SIR target (desired SIR). The SIR target is determined by an outer loop TPC. If the measured SIR is above the SIR target a TPC command is formed to order the mobile station to reduce its power and if the SIR measurement is below the SIR target, the TPC command is formed to ask the mobile station to increase its power.

To describe this embodiment of the invention in detail we consider the WCDMA UL with one active Enhanced UL (EUL and one active voice link. IC is applied by demodulating the EUL, decoding the same and then regenerating the corresponding signal and finally canceling its signal from the antenna data. This is just an example where the number of links and the choice of services have been chosen to simplify the description. The invention as such is not limited to this example.

The power is estimated as usual once a slot on the DPCCH. Then the interference is estimated by predicting the interference using the knowledge of what interference that is expected to be cancelled. The amount of interference that is assumed to be cancelled by applying a subsequent IC is then subtracted. Then, a TPC command is formed for each slot comparing the predicted SIR with the SIR target, as usual.

In this embodiment, the actual interference cancellation is performed after the predicted SIR is used and is performed by first demodulating and decoding one complete TTI of the EUL signal. Then the same signal is regenerated and cancelled from the antenna buffer.

For the voice user, or more general, users that eventually will be demodulating a signal from which interference has been removed, TPC is maintained by estimating the received power for each slot. The interference is estimated by first estimating the interference of each slot when no IC has been applied, and then compensating for the expected reduction of interference due to the following IC. The amount the interference will be reduced by can be estimated in many ways. In this particular embodiment the reduced interference is assumed to be equal to the power of the EUL user times one minus a constant cancellation efficiency factor $\hat{P}_I^{IC} = P_{I,EUL} \cdot (1-\alpha)$, where $\alpha$ is the constant cancellation efficiency factor.

An alternative approach is to have a cancellation factor that is dependent on the SIR, or some other quality measure, of the EUL user. For instance we could have a cancellation factor equal to 80% if SIR of the EUL user is larger than X dB and 10% if SIR of the same EUL user is below Y dB.

Yet an alternative approach is to have a cancellation factor that is dependent on the EUL interference. For instance we could have a cancellation factor equal to 80% if the EUL interference is larger than X dB and 10% if EUL interference is below Y dB.

In the embodiment above, the node having the improved SIR estimation is a base station, since UL signaling is handled. However, the basic ideas operate also beneficially on downlink (DL) traffic. In such a case, the node having the improved SIR estimation will be a mobile station.

Figure 4:
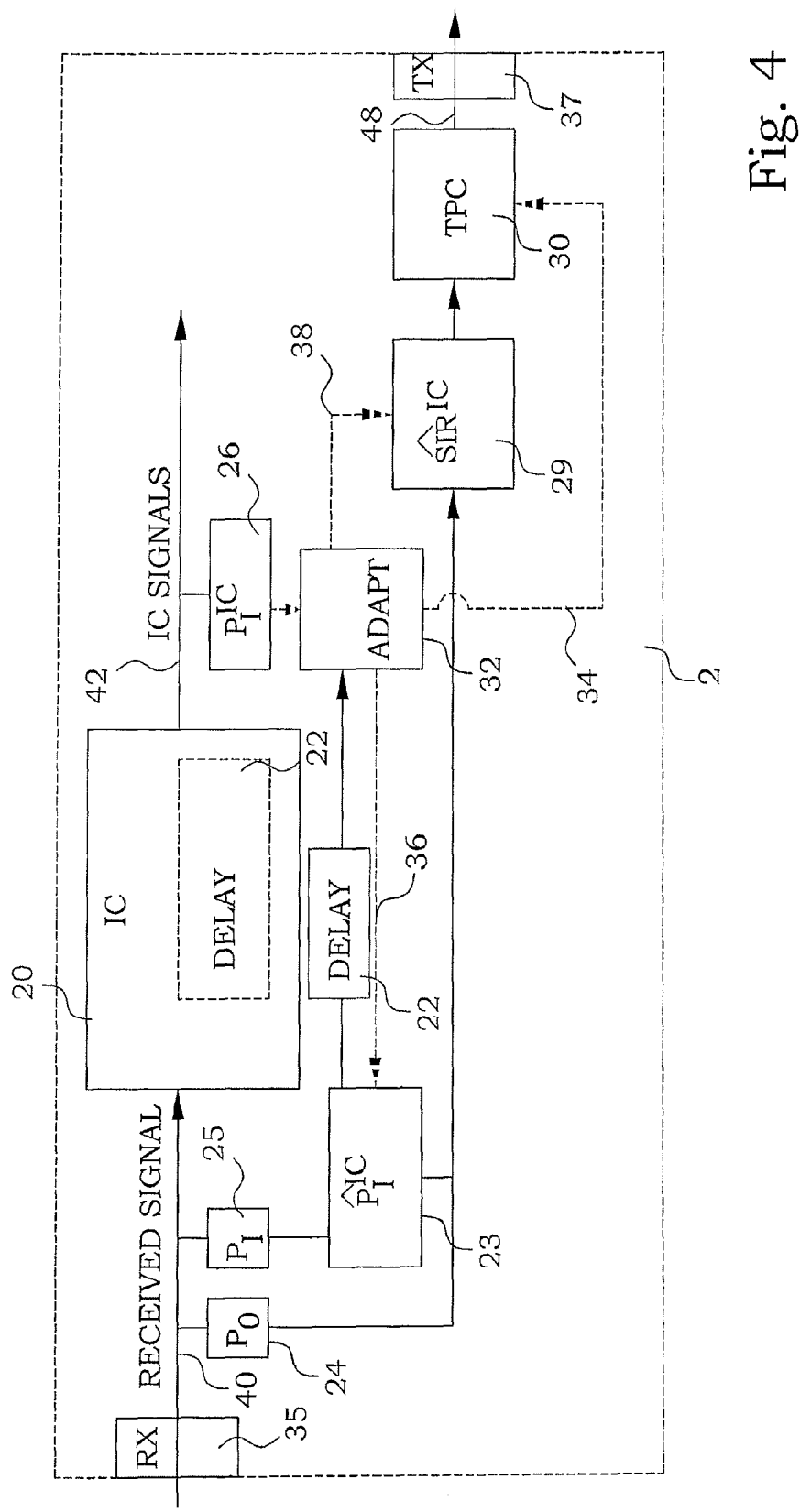
FIG. 4 is a block diagram of another embodiment of a node using transmit power control according to the present invention.

In a further embodiment of the present invention, a safety net for predictions errors is introduced by measuring the actual SIR after IC and adjusting the following SIR estimation and/or TPC commands to compensate for the potential prediction errors. This compensation can be done in different ways. FIG. 4 illustrates a node having the capability of prediction error compensation. Most parts are similar to the ones presented in FIG. 3. However, a means 26 for determining postcancellation interference values for the signals interfering with the first signal is connected to have access to the interference cancelled signal 42. This determined postcancellation interference value $P_I^{IC}$ is provided to an adaptor 32, in this embodiment also connected to the predictor 23. The adaptor 32 is in this embodiment arranged for adapting the function used by the predictor 23. The adaptation is based on a comparison between the determined postcancellation interference values and corresponding predicted postcancellation interference values. The predicted postcancellation interference values are thereby provided to the adaptor 23 with a delay 22, corresponding to the delay caused by the interference canceller. The most straightforward solution is to adapt the predictor to operate according to $\hat{P}_I^{IC} = P_I(1-\alpha) - \Delta P_I^{IC}$, where $\Delta P_I^{IC} = P_I^{IC} - \hat{P}_I^{IC}$ for a previous signal sequence.

In one embodiment, the cancellation efficiency factor $\alpha$ is instead updated. One approach is to just change the cancellation efficiency factor to the cancellation efficiency factor that would have given the same determined postcancellation interference values as measured, i.e.

$$\alpha_{update} = 1 - \frac{P_I^{IC}}{P_I}.$$

Such an approach may, however, be subject of oscillations due to inaccurate determinations. Another more gently approach is to add the determined postcancellation interference values to a filter. By designing the filter properly, the output of the filter can be used as an updated cancellation efficiency factor. Here, one simple possibility is to compensate for half the discrepancy each time, which gives a more damped adaptation. The updated cancellation efficiency factor is then given by $$\alpha_{update} = \frac{1}{2}\left(\alpha + 1 - \frac{P_I^{IC}}{P_I}\right).$$

The updated cancellation efficiency factor can then be used for a subsequent signal sequence.

This adaptation can be seen as a safety net. After IC has been applied, the actual SIR can be estimated by measuring the power of the DPCCH (in case of a WCDMA system) and the interference on the same, now with parts of the interference removed. The actual SIR can then be compared with the predicted SIR obtained before IC was applied. If there are differences between the predicted SIR and the actual SIR, then this difference can be compensated for by adjusting e.g. the prediction.

Adaptation can also be performed at other positions in the chain. The determined postcancellation interference value $P_I^{IC}$ can also be provided 38 to the estimator 29, where the estimation of the SIR value for a subsequent signal sequence can be modified based on the postcancellation interference value $P_I^{IC}$. This approach has, however, the disadvantage that errors in any modelling of e.g. the cancellation efficiency factor will be improved. On the other hand, temporary discrepancies which are not wished to influence the cancellation efficiency factor can easily be compensated in this way.

In yet another embodiment, the adaptation can be performed directly in the TPC 30. The adaptor 32 provides information 34 about the determined postcancellation interference value $P_I^{IC}$, either as such or as a comparison with the predicted postcancellation interference values $\hat{P}_I^{IC}$. For instance, if the actual SIR is larger than the predicted SIR, i.e. the actual postcancellation interference value $P_I^{IC}$ is smaller than the predicted postcancellation interference values $\hat{P}_I^{IC}$, then the following TPC commands could be modified to reduce power transmitted by the mobile station. On the other hand, if the actual SIR is lower than the predicted SIR then the TPC commands could be modified to increase the transmission power of the user equipment.

Figure 5:
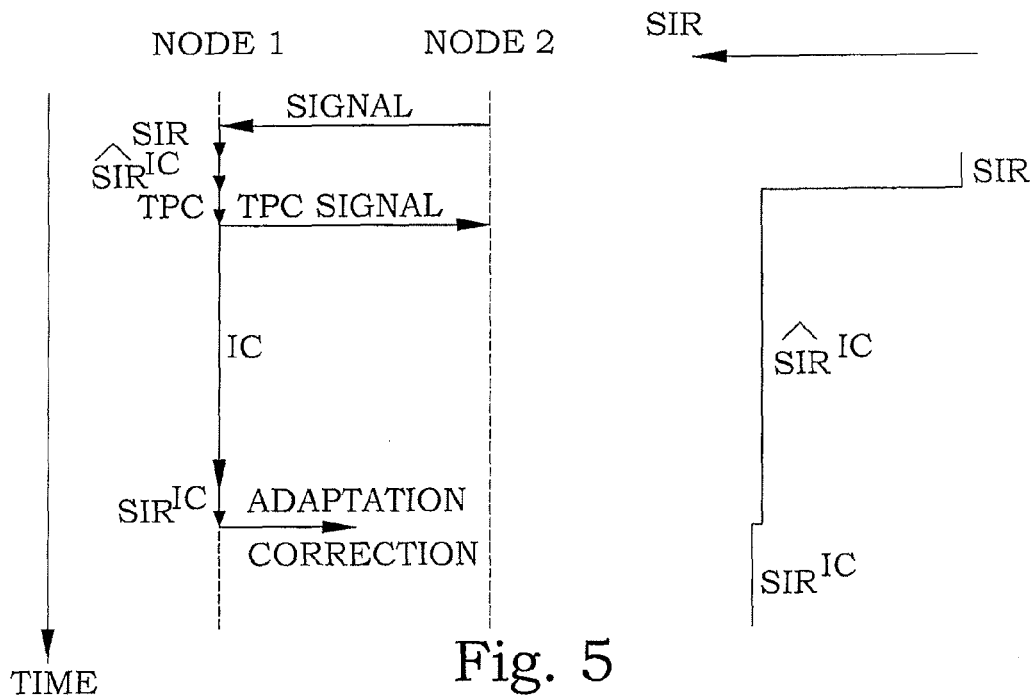
FIG. 5 is a time diagram illustrating timing of estimations of signal-to-interference ratio.

The timing is an important factor in the present invention. The provision of a good prediction of the final SIR conditions at an early stage in the process contributes to the advantages of the invention. FIG. 5 is a time diagram illustrating such timing properties. A signal is sent from a second node to a first node. Within a very short period of time, a SIR can be established for the received signal. Also within a very short period of time, a $\hat{SIR}^{IC}$ value based on predicted postcancellation interference values is available. A TPC signal can be created based on such $\hat{SIR}^{IC}$ value to provide power control with a short delay. Interference cancellation can then be performed, which occupies a considerably longer period of time. After the interference cancellation, the postcancellation interference can be determined in an ordinary way and a correct $SIR^{IC}$ value can be obtained. This correct $\hat{SIR}^{IC}$ value is expected to be very close to the predicted one. Any minor remaining differences may be taken care of by using corrections or adaptations according to what was described further above.

The corrections and adaptations may preferably be performed for each signal sequence. However, for stable and well-characterised systems it might be beneficial to reduce the adaptation rate.

Figure 6:
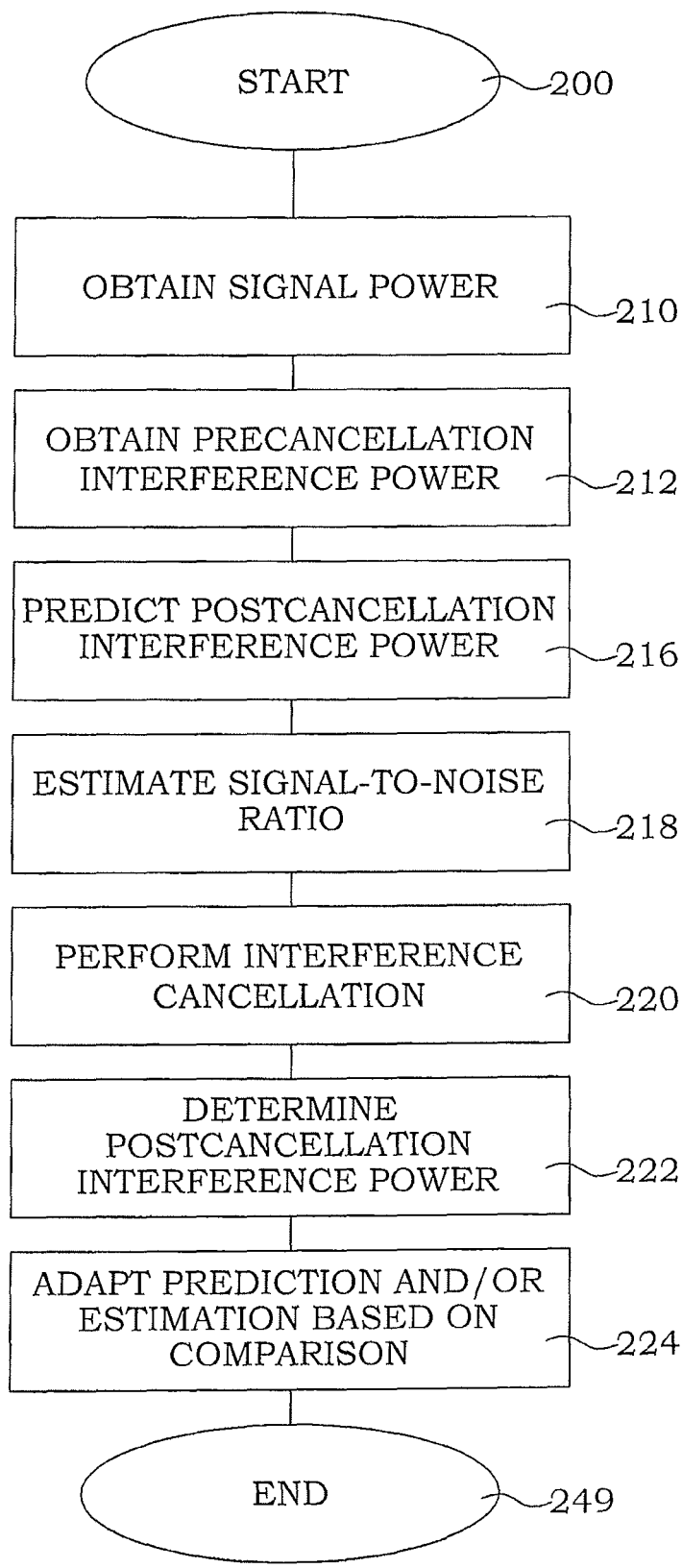
FIG. 6 is a flow diagram illustrating steps of an embodiment of a method according to the present invention.

FIG. 6 illustrates a flow diagram of steps of a method according to the present invention. The method for estimating a signal-to-interference ratio in a cellular communication system having interfering signalling and employing interference cancellation techniques for mitigating the interfering signalling begins in step 200. In step 210, a signal value representing power of a first signal is obtained. At least one precancellation interference value representing powers of signals interfering with the first signal before the interference cancellation is employed is obtained in step 212. In step 216 a postcancellation interference value is predicted. The postcancellation interference value represents a sum of powers of signals interfering with the first signal after the interference cancellation and is predicted as a function of the precancellation interference value(s). The prediction follows the discussions given further above. A signal-to-interference ratio is estimated in step 218. The signal-to-interference ratio is estimated as a ratio between the signal value and the predicted postcancellation interference value.

Preferably, as is the case in the present embodiment, interference cancellation is performed in step 220. In step 222, a postcancellation interference power is determined. In step 224, the prediction and/or estimation is adapted for a subsequent signal sequence based on a comparison between the determined postcancellation interference power and the predicted postcancellation interference power. The procedure ends in step 249.

Figure 7:
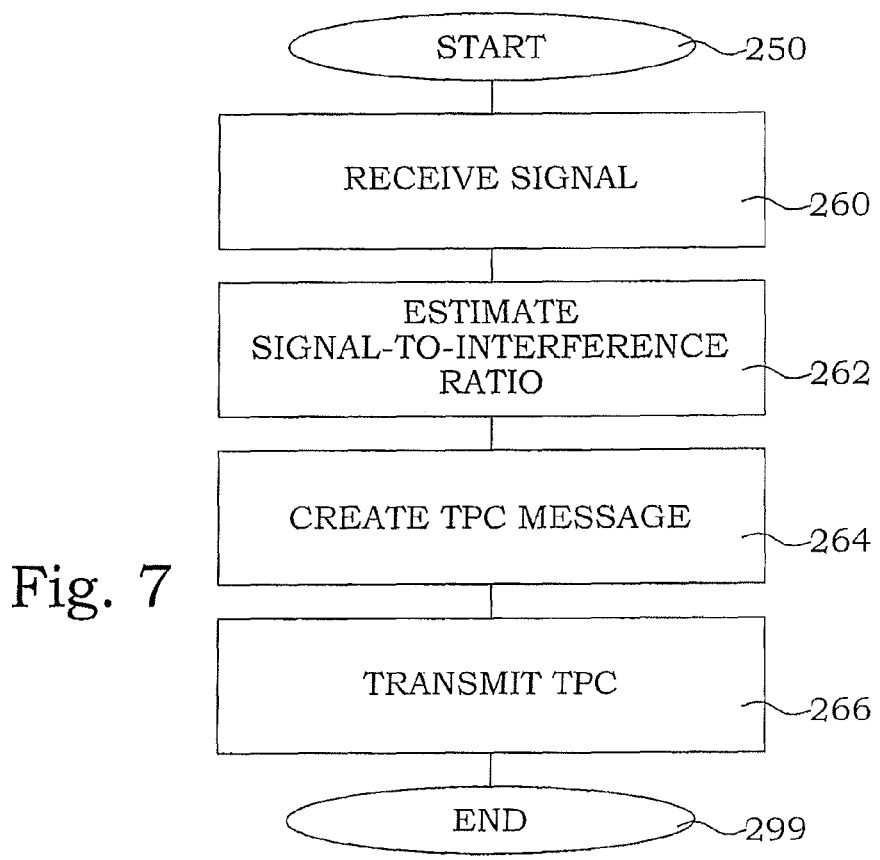
FIG. 7 is a flow diagram illustrating steps of an embodiment of another method according to the present invention.

FIG. 7 illustrates a flow diagram of steps of an embodiment of another method according to the present invention. The method for power control in a cellular communication system having interfering signalling and employing interference cancellation techniques for mitigating the interfering signalling begins in step 250. In step 260 a signal comprising a first signal and signals interfering with the first signal is received. In step 262, a signal-to-interference ratio of the received signal is estimated according to steps 210-218 of FIG. 6. A transmit power control message is created in step 264 based on the estimated signal-to-interference ratio. In step 266, the transmit power control message is transmitted, addressed to a node associated with transmission of the first signal. The procedure ends in step 299. In order to utilize the interference cancellation capability, interference cancellation on the received signal is typically performed, although not explicitly shown in the figure.

As mentioned above, in a preferred embodiment, determined postcancellation interference values for the signals interfering with the first signal can be utilized for adapting the transmit power control message.

There are several aspects related to control channel handling and IC. In most described embodiments, the TPC of user's signal that can benefit from IC is primarily concerned. Furthermore, in the described embodiment, it is primarily considered TPC and IC for WCDMA UL. However, the technique is generally applicable and could apply to most communication systems when applying IC to a system relying on efficient TPC. More particularly, this method is generally applicable to any method that relies on a fast interference power estimate while there is a delay in the demodulator. This delay can be due to IC or some other advanced signal processing such as equalization, interference suppression or multi-user detection.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A method for estimating a signal-to-interference ratio in a cellular communication system having interfering signals and employing interference cancellation techniques for mitigating said interfering signals, the method being implemented by a node in the cellular communication system and comprising:

obtaining a signal value representing power of a first signal;

obtaining at least one precancellation interference value representing powers of signals interfering with said first signal before said interference cancellation is employed;

predicting, as a function of said at least one precancellation interference value, a postcancellation interference value representing a sum of powers of signals interfering with said first signal after said interference cancellation is employed; and estimating the signal-to-interference ratio as a ratio between said signal value representing said power of said first signal and said predicted postcancellation interference value.

2. The method of claim 1, wherein said predicting comprises predicting the postcancellation interference value as a function of the sum of said powers of signals interfering with said first signal.

3. The method of claim 1, wherein said predicting comprises predicting the postcancellation interference value as a sum of functions of a respective one of said powers of signals interfering with said first signal.

4. The method of claim 1, wherein said function is dependent on an estimated cancellation efficiency.

5. The method of claim 4, wherein said function is a linear function having a proportionality constant equal to $(1-\alpha)$, where $\alpha$ is said estimated cancellation efficiency.

6. The method of claim 4, wherein said function is piecewise linear.

7. The method of claim 1, further comprising:
performing interference cancellation on said first signal and said signals interfering with said first signal;
determining postcancellation interference values for said signals interfering with said first signal; and
adapting said function based on a comparison between said determined postcancellation interference values and corresponding said estimated postcancellation interference values for a subsequent signal sequence.

8. The method of claim 7, wherein said adapting is performed once each signal sequence.

9. The method of claim 1, wherein said cellular communication system utilizes Wideband Code Division Multiple Access (WCDMA).

10. The method of claim 1, wherein said first signal is an uplink signal.

11. The method of claim 1, wherein said first signal is a downlink signal.

12. A method for power control in a cellular communication system having interfering signals and employing interference cancellation techniques for mitigating said interfering signals, the method comprising:
receiving a signal comprising a first signal and signals interfering with said first signal;
obtaining a signal value representing power of the first signal;
obtaining at least one precancellation interference value representing powers of the signals interfering with said first signal before said interference cancellation is employed;
predicting, as a function of said at least one precancellation interference value, a postcancellation interference value representing a sum of powers of the signals interfering with said first signal after said interference cancellation is employed;
estimating a signal-to-interference ratio of said received signal as a ratio between said signal value representing said power of said first signal and said predicted postcancellation interference value;
creating a transmit power control message based on said estimated signal-to-interference ratio;
transmitting said transmit power control message addressed to a node associated with transmission of said first signal; and
performing interference cancellation on said received signal.

13. The method of claim 12, further comprising:
determining postcancellation interference values for said signals interfering with said first signal; and
adapting said transmit power control message based on a comparison between said determined postcancellation interference values and corresponding said estimated postcancellation interference values for a subsequent signal sequence.

14. The method of claim 12, wherein said cellular communication system utilizes Wideband Code Division Multiple Access (WCDMA).

15. The method of claim 12, wherein said first signal is an uplink signal.

16. The method of claim 12, wherein said first signal is a downlink signal.

17. A node for use in a cellular communication system having interfering signals and employing interference cancellation techniques for mitigating said interfering signals, the node comprising:
a first power meter configured to obtain a signal value representing power of a first signal;
a second power meter configured to obtain at least one precancellation interference value representing powers of signals interfering with said first signal before said interference cancellation is employed;
a predictor connected to said second power meter and configured to predict, as a function of said at least one precancellation interference value, a postcancellation interference value representing a sum of powers of signals interfering with said first signal after said interference cancellation; and
an estimator connected to said predictor and said first power meter, and configured to estimate a signal-to-interference ratio as a ratio between said signal value representing said power of said first signal and said predicted postcancellation interference value.

18. The node of claim 17, wherein the predictor is configured to predict the postcancellation interference value as a function of the sum of said powers of signals interfering with said first signal.

19. The node of claim 17, wherein the predictor is configured to predict the postcancellation interference value as a sum of functions of a respective one of said powers of signals interfering with said first signal.

20. The node of claim 17, wherein said function is dependent on an estimated cancellation efficiency.

21. The node of claim 20, wherein said function is a linear function having a proportionality constant equal to $(1-\alpha)$, where $\alpha$ is said estimated cancellation efficiency.

22. The node of claim 20, wherein said function is piecewise linear.

23. The node of claim 17, further comprising:
an interference canceller operable on said first signal and said signals interfering with said first signal;
a third power meter connected to said interference canceller and configured to determine postcancellation interference values for said signals interfering with said first signal; and
an adaptor connected to said predictor and said third power meter, and configured to adapt said function based on a comparison between said determined postcancellation interference values and corresponding said estimated postcancellation interference values for a subsequent signal sequence.

24. The node of claim 23, wherein said adaptor is configured for perform said adapting once each signal sequence.

25. The node of claim 17, further comprising:
a receiver configured to receive a signal comprising said first signal and said signals interfering with said first signal;
a power controller connected to said estimator and configured to create a transmit power control message based on said estimated signal-to-interference ratio;
a transmitter connected to said power control and configured to transmit said transmit power control message addressed to a node associated with transmission of said first signal; and
an interference canceller connected to said receiver and configured to perform interference cancellation on said received signal.

26. The node of claim 25, further comprising:
a third power meter connected to said interference canceller and configured to determine postcancellation interference values for said signals interfering with said first signal; and
an adaptor connected to said predictor, said third power meter, and said power controller, and configured to adapt said transmit power control message based on a comparison between said determined postcancellation interference values and corresponding said estimated postcancellation interference values for a subsequent signal sequence.

27. The node of claim 17, wherein said node utilizes WCDMA.

28. The node of claim 17, wherein said node is a base station.

29. The node of claim 17, wherein said node is a mobile station.

* * * * *